(12) United States Patent
Selb et al.

(10) Patent No.: US 9,718,115 B2
(45) Date of Patent: Aug. 1, 2017

(54) PRODUCTION METHOD FOR A SEMI-FINISHED PRODUCT AND SEMI-FINISHED PRODUCT

(75) Inventors: Michael Selb, Feldkirch (AT); Matthias Wissling, St. Gallen (CH); Armin Kueper, Schellenberg (LI)

(73) Assignee: Hilti Aktiengesellschaft, Schaan (LI)

( * ) Notice: Subject to any disclaimer, the term of this patent is extended or adjusted under 35 U.S.C. 154(b) by 898 days.

(21) Appl. No.: 13/809,771

(22) PCT Filed: Jul. 14, 2011

(86) PCT No.: PCT/EP2011/062047
§ 371 (c)(1),
(2), (4) Date: Jan. 11, 2013

(87) PCT Pub. No.: WO2012/007543
PCT Pub. Date: Jan. 19, 2012

(65) Prior Publication Data
US 2013/0115025 A1    May 9, 2013

(30) Foreign Application Priority Data
Jul. 14, 2010    (DE) .................. 10 2010 031 316

(51) Int. Cl.
*B21H 3/02*    (2006.01)
*B21H 1/20*    (2006.01)
*B21H 1/22*    (2006.01)
*B21B 47/00*    (2006.01)
*F16B 35/00*    (2006.01)
*B21B 1/16*    (2006.01)
*B21B 1/18*    (2006.01)

(52) U.S. Cl.
CPC ............... *B21H 3/02* (2013.01); *B21B 47/00* (2013.01); *B21H 1/20* (2013.01); *B21H 1/22* (2013.01); *B21H 3/022* (2013.01); *F16B 35/00* (2013.01); *B21B 1/16* (2013.01); *B21B 1/18* (2013.01)

(58) Field of Classification Search
CPC ... F16B 35/00; B21B 1/16; B21B 1/18; B21B 47/00; B21H 3/02; B21H 1/20; B21H 1/22; B21H 3/022
USPC ....... 72/10.3, 77, 100, 110, 197, 234, 370.2; 470/8, 10, 12, 57, 66
See application file for complete search history.

(56) References Cited

U.S. PATENT DOCUMENTS

| 996,840 A | 7/1911 | Deeds |
| 1,560,749 A | 11/1925 | Witherow |

(Continued)

FOREIGN PATENT DOCUMENTS

| CN | 2030513 | 1/1989 |
| CN | 1038041 | 12/1989 |

(Continued)

*Primary Examiner* — David B Jones
(74) *Attorney, Agent, or Firm* — Davidson, Davidson & Kappel, LLC

(57) ABSTRACT

The production method according to the invention for creating a thread in an elongated semi-finished product comprises the following steps: shaping, especially lengthwise rolling, of at least two lengthwise grooves into a blank and lengthwise rolling of a thread into the areas circumferentially delimited by the grooves. The distance from the beds of the grooves to the axis of the blank is smaller than the distance from the root of the thread to the axis.

13 Claims, 2 Drawing Sheets

(56) References Cited

U.S. PATENT DOCUMENTS

| | | | |
|---|---|---|---|
| 1,570,660 A | | 1/1926 | Witherow et al. |
| 1,998,970 A | | 4/1935 | Sloan |
| 3,137,185 A | * | 6/1964 | Glicken .......................... 72/100 |
| 3,170,343 A | | 2/1965 | Gauriat |
| 3,592,727 A | | 7/1971 | Weaver et al. |
| 3,722,249 A | * | 3/1973 | Zhukevich-Stosha . B21D 15/06 72/187 |
| 4,955,219 A | | 9/1990 | Josef et al. |
| 5,797,710 A | | 8/1998 | Sawabe |
| 7,374,494 B2 | * | 5/2008 | Brewer et al. ................... 470/12 |
| 2002/0123417 A1 | | 9/2002 | Cote |
| 2003/0070465 A1 | | 4/2003 | Kashiwagi et al. |
| 2010/0048309 A1 | | 2/2010 | Gensert |
| 2010/0218576 A1 | | 9/2010 | Felkl |

FOREIGN PATENT DOCUMENTS

| | | |
|---|---|---|
| CN | 2285173 | 7/1998 |
| CN | 2513696 | 10/2002 |
| DE | 4232115 | 3/1994 |
| DE | 10025060 | 1/2001 |
| DE | 102004016193 | 10/2005 |
| EP | 0 754 511 A2 | 1/1997 |
| EP | 2 156 909 | 2/2010 |
| GB | 2 321 607 | 8/1998 |
| GB | 2321607 | 8/1998 |
| JP | 62 244 543 | 10/1987 |
| JP | 2010075963 | 4/2010 |

* cited by examiner

PRODUCTION METHOD FOR A SEMI-FINISHED PRODUCT AND SEMI-FINISHED PRODUCT

The present invention relates to a production method for a semi-finished product, especially an elongated semi-finished product having at least two differently profiled sections, for instance, an anchor bolt.

BACKGROUND

A thread on an anchor bolt can be created by means of cross-rolling. A cylindrical blank is inserted between two roller profiles and is then rolled along the roller profiles while being rotated around its axis. In this process, the roller profiles emboss ridges for the thread into the circumference of the blank. The high quality of the thread that can be achieved is due, among other things, to the rolling procedure and to the associated uniform radial dimensions.

SUMMARY OF THE INVENTION

A drawback is that the length of the thread is prescribed by the width of the roller profiles employed.

The present invention provides a method for creating a thread in an elongated semi-finished product comprises the following steps: shaping, especially lengthwise rolling, of at least two lengthwise grooves into a blank and lengthwise rolling of a thread into the areas circumferentially delimited by the grooves. The distance from the beds of the grooves to the axis of the blank is smaller than the distance from the root of the thread to the axis. The distance from the root of the thread to the axis equals half the core diameter of the thread.

Lengthwise rolling is actually unfavorable for creating a thread since, in contrast to cross-rolling, it does not take into account the rotating symmetry of the thread. The material that flows during the rolling procedure is not pushed uniformly along the circumference. The material can escape in an uncontrolled manner in the area of the lateral edges of the roller profiles. The grooves can collect the laterally escaping material in order to prevent the formation of burrs or other structures protruding radially into the thread. Here, weakening of the thread due to gaps formed in the thread by the grooves has to be accepted.

One embodiment provides that the blank is conveyed along a direction of movement. Rollers that serve to shape the thread rotate around a rotational axis perpendicular to the direction of movement.

One embodiment provides that, in the case of a number N of grooves, the rollers are rotated with respect to the grooves around the axis by a quotient of 180° relative to the number N. A lateral edge of a roller profile of one of the rollers can be moved in a plane with the axis and with one of the grooves. The grooves can likewise be rolled lengthwise. The rollers for the lengthwise rolling of the grooves are arranged so as to be rotated around the axis by the quotient with respect to the rollers for the thread rolling. The rollers for the thread rolling can surround the blank annularly.

A semi-finished product according to the invention, especially an anchor bolt, has a cylindrical section into whose circumference at least two grooves have been formed that run parallel to the axis of the cylindrical section. The areas between the grooves are shaped to form segments of a thread. One embodiment proves that flanks of the thread each adjoin two of the grooves. The percentage of the thread on the circumference of the semi-finished product can amount to at least 80%. One embodiment provides that each groove extends over the entire length of the thread.

One embodiment provides that another section is shaped to form a conical expansion element.

BRIEF DESCRIPTION OF THE DRAWINGS

The description below explains the invention on the basis of embodiments and figures provided by way of an example. The figures show the following.

Unless otherwise indicated, identical elements or elements having the same function are designated with the same reference numerals in the figures.

DETAILED DESCRIPTION

Figure 1:
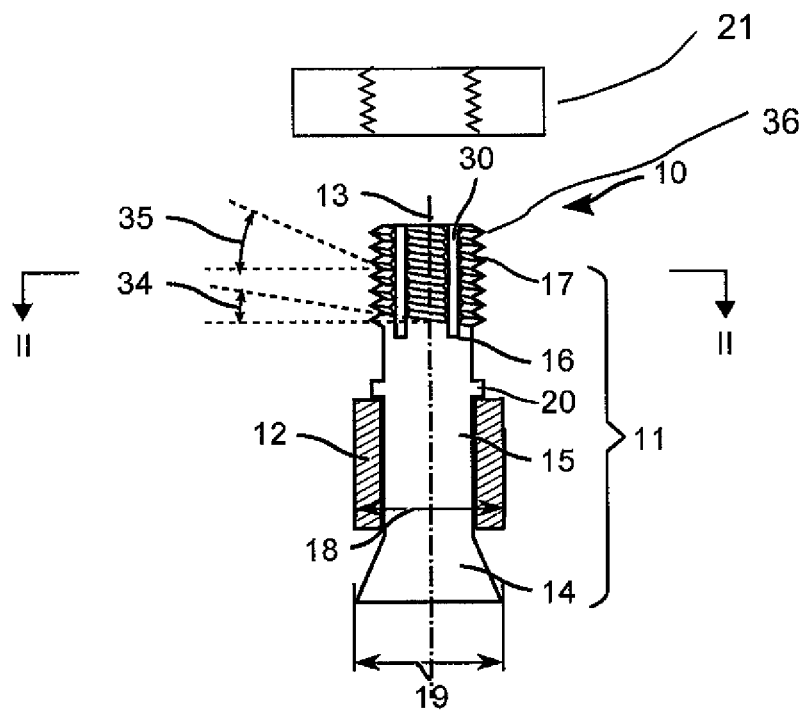
FIG. 1: an anchor.
Figure 2:
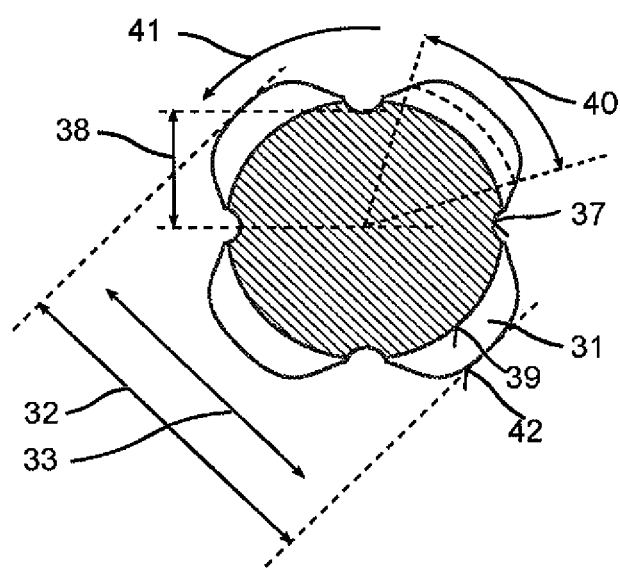
FIG. 2: a cross section in the plane II-II through the anchor.
Figure 3:
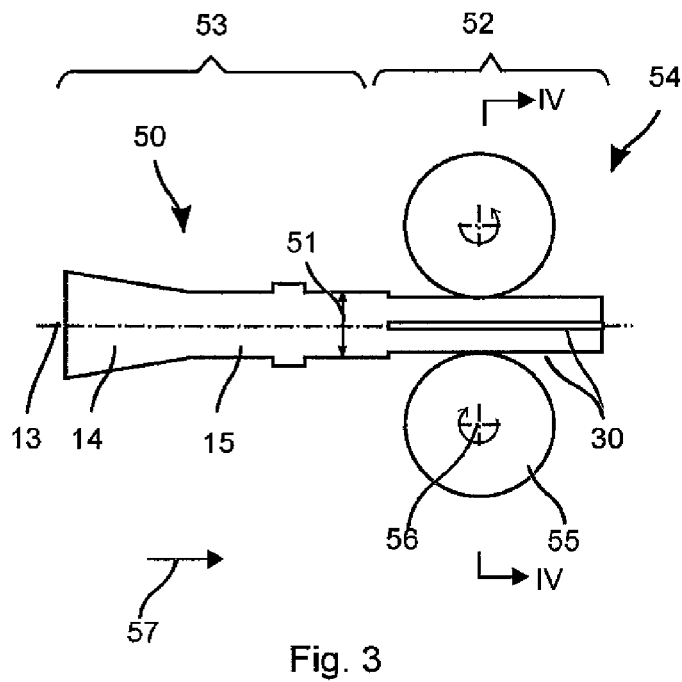
FIGS. 3 and 4: a method step for the production of the anchor.

FIG. 1 shows an anchor 10 that, by way of example, is configured as an expansion anchor with an anchor bolt 11 and an expansion sleeve 12. Along the axis 13 of the anchor bolt 11, there is an expansion element 14, a neck 15, a shank 16, and a thread 17. The expansion sleeve 12, which can move along the anchor bolt 11, is pre-mounted on the neck 15. The outer diameter 18 of the expansion sleeve 12 is about the same size as the largest diameter 19 of the expansion element 14. The anchor 10 is driven into a drilled hole having a diameter corresponding to the outer diameter 18 of the expansion sleeve 12. A ring-shaped collar 20 between the neck 15 and the thread 17 can prevent the expansion sleeve 12 from sliding off of the anchor bolt 11. When the anchor 10 is tightened against the substrate, for example, by means of a nut 21, the expansion element 14 is pulled into the expansion sleeve 12 and the expansion sleeve 12 is firmly clamped onto a side wall of the drilled hole.

The thread 17 is interrupted by several grooves 30 that run parallel to the axis 13. The grooves 30 are preferably uniformly distributed around the axis 13, for instance, four grooves at intervals of 90°. The grooves 30 preferably extend along the entire length of the thread 17. Therefore, the single-flight thread 17 is made up of several segments 31. Each of the segments 31 has the characteristic properties of a thread 17 such as, for instance, a rated diameter 32, a core diameter 33, a pitch angle 34, a flank angle 35 and a thread lead 36. The segments 31 are preferably configured in the form of a V-thread and they form the flanks of the thread. Preferably, the characteristic properties of all segments 31 are identical. The flank angle amounts to, for instance, 60°. The pitch angle 34 is preferably between 2° and 5°. The segments 31 only surround a fraction of the circumference; in case of the, for example, four grooves 30, between 75° and 85°.

The groove bed 37 of the groove 30 is preferably at a constant distance 38 from the axis 13. Half of the core diameter 33 of the thread 17 is preferably greater than the distance 38, that is to say, the thread root 39 is located further away from the axis 13 than the grooves 37 are. The grooves 30 are shaped into the anchor bolt 11 at a greater depth than the thread 17.

The width of the grooves 30 in the circumferential direction 41 is considerably smaller than the width 40 of the segments 31. Preferably, the segments 31 take up a portion of more than 80% (approximately 300°) of the total circumference. The boundaries of the segments 31 can be defined, for instance, as the points where the trailing flank 42 is only at a distance from the thread root 39 over half of its maximum distance (equal to one-fourth of the difference between the rated diameter 32 and the core diameter 33).

Figure 4:
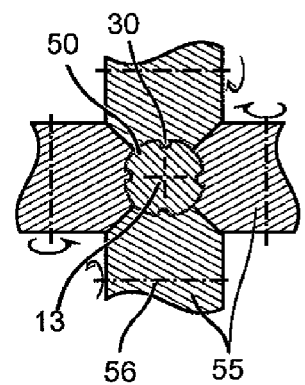
Figure 5:
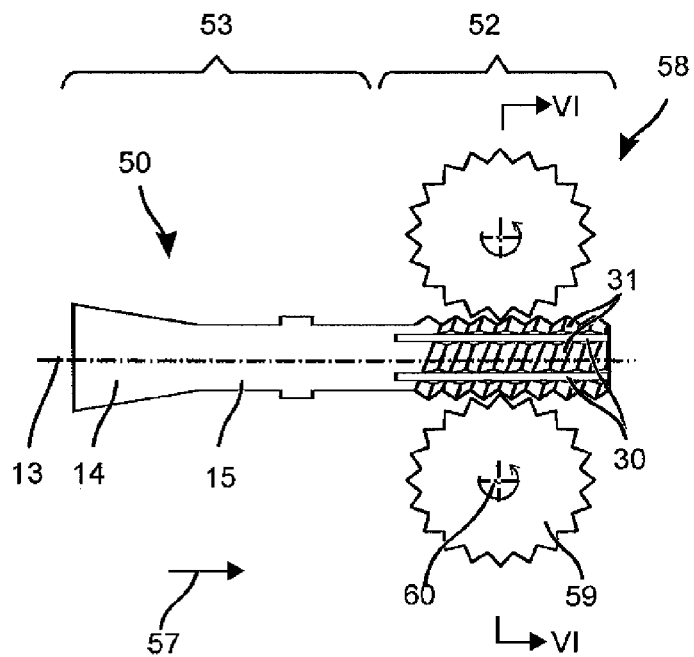
FIGS. 5 and 6: another method step for the production of the anchor.
Figure 6:
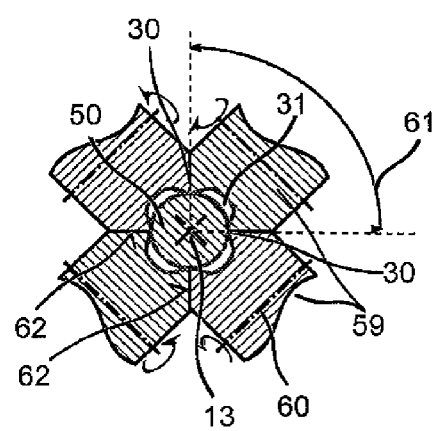

By way of an example, FIGS. 4 to 6 illustrate a production method for the anchor bolt 11. FIGS. 4 and 6 depict the cross sections through the anchor bolt 11 and a production tool in the planes IV-IV and VI-VI, respectively. A blank 50 is, for instance, a cylindrical piece of wire. The unshaped cross section of the wire is preferably circular. The diameter 51 of the wire is constant and harmonized with the thread 17, at least in a section 52 for the thread 17. For example, the diameter 51 of the wire can be the same as the flank diameter of the thread 17, that is to say, approximately the mean value of the outer and core diameter of the thread 17. The blank 50 provided by way of an example has already been shaped to form the expansion element 14 and the neck 15 in a section 53 by means of the rolling procedure. As an alternative, the entire blank 50 can have one diameter, especially if the thread 17 is supposed to be created along the entire blank 50.

The blank 50 is fed to a first roller stand 54 that rolls the grooves 30 into the section 52. The first roller stand 54 has several rollers 55 between which the blank 50 passes. The rollers 55 are rotated around their axes 56, which are oriented perpendicular to the direction of movement 57 of the blank 50. Each one of the rollers 55 embosses a groove 30 into the blank 50 along the axis 13. The roller stand 54 shown has four rollers 55 that grip the entire circumference of the blank 50. An alternative embodiment has two or more pairs of opposite rollers and the orientation of adjacent pairs with respect to the axis 13 differs.

The blank 50 provided with the grooves 30 is conveyed to a second roller stand 58 that creates the thread 17. The second roller stand 58 has several rollers 59 between which the blank 50 passes. The rollers 59 are rotated around their axes 60, which are oriented perpendicular to the direction of movement 57 of the blank 50. Each of the rollers 59 embosses segments 31 of the thread into the blank 50 along the axis 13. The advantageously configured roller stand 58 surrounds the circumference of the blank 50. The number of rollers 59 corresponds to the number of previously embossed grooves 30. Each of the rollers 59 completely covers an angular section 61 located between two grooves 30. Each lateral edge 62 of the roller profiles is in a plane with one of the grooves 30. The roller profile preferably does not touch the groove bed 37. The groove bed 37 can be partially filled by flowing material during the rolling procedure.

The rollers 59 of the second roller stand 58 are arranged so as to be rotated around the axis 13 by 45° with respect to the rollers 55 of the first roller stand 54. The angle of rotation corresponds to the quotient of 180° and the number of grooves 30.

The blank 50 can be fed through the rollers in one direction of movement. As an alternative, the blank 50 can be preferably pushed between the rollers and then removed from the rollers opposite to the direction of movement.

What is claimed is:

1. A production method for creating a thread in an elongated semi-finished product, comprising the following steps:
   shaping at least two lengthwise grooves into a blank and lengthwise rolling a thread into areas circumferentially delimited by the grooves, a distance from beds of the grooves to an axis of the blank being smaller than a distance from a root of the thread to the axis; wherein the blank is conveyed along a direction of movement and rollers that serve to shape the thread rotate around a rotational axis perpendicular to the direction of movement.

2. The production method as recited in claim 1 wherein, in the case of a number N of grooves, the rollers are rotated with respect to the grooves around the axis by a quotient of 180° relative to the number N.

3. The production method as recited in claim 1 wherein a lateral edge of a roller profile of one of the rollers is moved in a plane with the axis and with one of the grooves.

4. The production method as recited in claim 1 wherein the rollers surround the blank annularly.

5. The production method as recited in claim 1 wherein the at least two lengthwise grooves are formed parallel to the direction of movement.

6. The production method as recited in claim 1 wherein four of the rollers serve to shape the thread.

7. The production method as recited in claim 6 wherein each of the rollers completely covers an annular section located between two of the grooves.

8. A production method for creating a thread in an elongated semi-finished product, comprising the following steps:
   shaping at least two lengthwise grooves into a blank and lengthwise rolling a thread using rollers into areas circumferentially delimited by the grooves, a distance from beds of the grooves to an axis of the blank being smaller than a distance from a root of the thread to the axis wherein a lateral edge of a roller profile of one of the rollers is moved in a plane with the axis and with one of the grooves.

9. The production method as recited in claim 8 wherein the rollers surround the blank annularly.

10. The production method as recited in claim 8 wherein the at least two lengthwise grooves are formed parallel to the direction of movement.

11. The production method as recited in claim 8 wherein the at least two lengthwise grooves are formed parallel to the direction of movement.

12. The production method as recited in claim 8 wherein four of the rollers serve to shape the thread.

13. The production method as recited in claim 12 wherein each of the rollers completely covers an annular section located between two of the grooves.

\* \* \* \* \*